United States Patent Office 3,850,898
Patented Nov. 26, 1974

3,850,898
ANIONIC HIGH MOLECULAR FLOCCULANTS
Fumio Ide, Yahide Kotake, and Satoshi Korenaga, Otake, Japan, assignors to Mitsubishi Rayon Co., Ltd., Tokyo, Japan
No Drawing. Filed Mar. 16, 1973, Ser. No. 341,832
Claims priority, application Japan, Mar. 16, 1972, 47/26,775; Dec. 28, 1972, 48/1,808
Int. Cl. C08f 15/02
U.S. Cl. 260—86.1 R
9 Claims

ABSTRACT OF THE DISCLOSURE

Anionic high molecular flocculants with sedimentation accelerating action are obtained by introducing to polyacrylic acid or polymethacrylic acid a specific hydrophobic monomer unit of which homopolymers are insoluble in water. The high molecular flocculants in the form of water-soluble copolymer powders are obtained by adding a suspension of the copolymer to hydroxides of an alkali metal or ammonia dissolved in an alcohol of $C_1$ to $C_6$ and separating thus neutralized copolymer particles from the suspension.

BACKGROUND OF THE INVENTION

The present invention relates to a new type of anionic high molecular coagulant with excellent performance.

Recently contamination of rivers and sea because of industrial wastes has brought on public discussion and become an issue. To deal with such a situation further progress in industrial waste treatments is being requested. The industrial waste treatments are realized by a number of means in organic combination and each means have recently shown a marked advance. Particularly, in the treatment means for flocculation sedimentation or floatation flocculants are extensively employed to accelerate sedimentation or flotation of flocculated matters (floc) and demands therefore are showing a yearly increase.

In organic salts such as aluminum sulphate and ferric chloride have extensively been used as coagulants in the past, but these were dissatisfactory in the light of various situations of industrial wastes and public requirements for waste treatment of high order. Therefore, demands for high molecular flocculants with excellent performance have recently been remarkably increased.

The high molecular flocculants are classified to an non-ionic type, anionic type and cationic type in the light of the electric charge. The cationic flocculants are available commercially in the different types, and as the nonionic or anionic high molecular flocculants polyacrylamide and its partially hydrolyzed products or anion-modified products respectively are well known. Besides, as the commercially available anionic types, there is only sodium polyacrylate.

Comparing polyacrylamide with its anion-modified product in a suspension in which polyvalent metals are not present, in many cases the later is effective in general. For example, when a suspension of kaolin adjusted to a neutral pH is sedimented, the polyacrylamide type wherein the acrylamide unit was partially hydrolyzed to about 20 to 30 mol percent is most effective, but a further hydrolyzed polyacrylamide type is remarkably reduced in the performance. On the other hand, sodium polyacrylate is far inferior in the performance to the polyacrylamide type.

To the contrary, in case of a plating waste, metal-containing waste such as a steel-containing waste, gravel-containing waste or the other waste containing a large quantity of metallic ions, the flocculants considerably rich in an anion group in the molecule are suitable. Therefore sodium polyacrylate and a highly hydrolyzed polyacrylamide type flocculant have mainly been used. However, the polyacrylamide with high content of the anionic group, its carboxyl group content exceeding 50 mol percent, is practically reduced in cohesive force and therefore cannot be used as a flocculant. Accordingly, those containing the carboxyl group of 50 mol percent or less are practically used. In this case these materials show a considerably excellent sedimentation accelerating action while in many cases a supernatant fluid after sedimentation is dissatisfactory in clearness.

On the other hand, sodium polyacrylate is inferior in the sedimentation accelerating action to the polyacrylamide type flocculants and therefore not necessarily effective notwithstanding the high anionic group content.

An object of the present invention is to provide a high molecular anionic flocculant with excellent performance.

Another object of the present invention is to provide such a flocculant that sedimentation of sludges is remarkably accelerated.

Still another object of the present invention is to provide a novel process for obtaining easily a high molecular anionic flocculant in the form of particles.

SUMMARY OF THE INVENTION

A high molecular flocculant according to the present invention comprises a polymer with molecular weight more than 100,000, soluble in water at a pH of 7 and comprising 50 to 98 weight percent of a polymeric unit represented by the formula

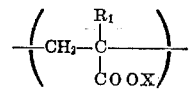

and 2 to 50 weight percent of a polymeric unit represented by the formula

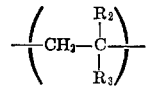

wherein X represents hydrogen, an alkali metal or an amine radical, $R_1$ and $R_2$ each represents hydrogen or methyl, and $R_3$ represents —$COOR_4$ radical wherein $R_4$ represents alkyl, aryl or alkylaryl or —CN radicals.

The high molecular flocculant in the form of particles is obtained by polymerizing 55–95 wt. percent of at least one of acrylic acid and methacrylic acid and 45–5 wt. percent of at least one of monomers represented by the formula

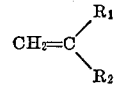

wherein $R_1$ represents hydrogen or methyl, and $R_2$ represents —$COOR_3$ radical wherein $R_3$ represents alkyl, aryl or alkylaryl groups or —CN radical in aqueous medium with stirring to produce a suspension of a copolymer which is insoluble under the polymerization conditions but soluble in neutral or alkaline water, adding said suspension into at least one of hydroxides of an alkali metal and ammonia dissolved in at least one of alcohols of $C_1$ to $C_6$ or a water-containing alcohol with stirring thereby obtaining an alcohol suspension of a water-soluble copolymer with its carboxyl group being completely or partially neutralized, and thereafter removing the copolymer in form of particles followed by filtering and drying.

DETAILED DESCRIPTION OF THE INVENTION

The flocculants according to the present invention remarkably accelerate sedimentation, for example, of fine particles with anionic charge such as clay like the conventional polyacrylamide type.

However, floc produced by the use of the flocculant according to the present invention has a high density and is reduced in water content of sediments as compared with the case of using acrylamide type flocculants, and as a result the sediments can be easily post-treated. Further, as the floc shows a markedly large resistance to a mechanical force such as stirring as compared with floc obtained by the acrylamide type coagulants, the flocculants of the present invention are superior in filtering of sludges to the acrylamide type. Furthermore, in case of the acrylamide type a supernatant fluid clarified once becomes muddy again by stirring after the addition of flocculants, while the flocculants of the present invention have the advantages that the supernatant liquid is further clarified by stirring.

In case of sedimenting a suspension of clay with the acrylamide type, the sedimentation accelerating action is suddenly reduced when decreasing an additional amount of the flocculant and at the same time the supernatant liquid is markedly reduced in the light transmittance. To the contrary, the flocculants of the present invention, with a high addition amount, for example, the addition of more than 5 p.p.m. to a 5% suspension of clay (a pH of 7) show about the same sedimentation accelerating action as the acrylamide flocculants, but if the addition amount is below 5 p.p.m. the sedimentation accelerating action is remarkably increased as compared with the acrylamide type. Particularly, in the case of addition of less than 3 p.p.m. the acrylamide type has no effect on clarification because it is reduced in sedimentation accelerating action and the supernatant liquid is about the same in turbidity as the case of no addition of the flocculant, while the flocculants of the present inventon have still a high level on both the sedimentation accelerating action and clarification action. Accordingly the flocculants of the present invention are suitable for practical use, particularly economical.

Also, unless the conventional acrylamide type flocculants alone are used in large quantities, it is difficult to sediment a suspension of fine particles of metallic hydroxides not containing inorganic salts, such as $Mg(OH)_2$ or $Al(OH)_3$ and it is impossible to clarify the supernatant liquid. To the contrary, the flocculants of the present invention with a small qauntity have an excellent sedimentation accelerating action on such a suspension and further the supernatant liquid is markedly improved in clearness.

Thus, flocculants effective with a small quantity for accelerating sedimentation of finely powdered metallic hydroxides as well as clay have not been obtained until now, accordingly the flocculants of the present invention have epoch-making properties.

The high molecular anionic flocculants are in general said to be advantageous for flocculation when the molecules in water are stretching to some extent. This is evident from the fact that in case of sedimenting clay under neutrality polyacrylamides become advantageous by hydrolyizing them partially to introduce sodium carboxylate group thereby stretching the molecules by an electric repulsion between the carboxyl anions in the molecule. Taking this into consideration, when introducing hydrophobic monomer units into a polymer rich in hydrophilic groups such as polymers of acrylic acid as in the present invention, the molecules would be expected to shrink reversely and flocculation properties would be expected to degrade in the light of the common sense: nevertheless, the fact that high molecular flocculants with excellent properties can be obtained as mentioned above is surprising and could not be anticipated at all from the theories on the conventional flocculants.

For preparing the flocculants of the present invention there are three methods, namely copolymerization, partial hydrolysis and partial esterification. The partial hydrolysis method includes partially hydrolyizing, for example, polyacrylate or polymethacrylate with an alkali or acid under suitable conditions.

Also, flocculants with various properties may be obtained by partially hydrolizing copolymers of acrylate and methacrylate or copolymers of acrylate or methacrylate and acrylonitrile or methacrylonitrile. Solvents for the starting materials or products may be used as a medium for the partial hydrolysis and if the solvents for the starting materials are used the hydrolysis reaction rapidly proceeds. For synthesizing the starting materials, for example polymethylacrylate and polymethylmethacrylate an emulsion polymerization is most effective. The hydrolysis may be effected after the product thus obtained has been flocculated to to remove the polymer or directly carried out by synthesizing an emulsion with high electrolyte stability and adding an alkali or acid to same.

Another method for preparing the flocculants of the present invention includes partially esterify polymethacrylic acid or polyacrylic acid or acrylic acid-methacrylic acid copolymers or salts thereof. For example methylesterification may be effected with diazomethane or esters with various alcohols may be synthesized with use of suitable catalysts.

However, for preparing the flocculant of the present invention the copolymerization method is most suitable. The flocculants are obtained by dissolving a mixture of acrylic or methacrylic acid or salts thereof and acrylate, methacrylate, acrylonitrile or methacrylonitrile in a suitabse ratio in a suitable medium, adding a polymerization initiator and carrying out a polymerization at a suitable temperature and optionally effecting neutralization if acrylic or methacrylic acid is used.

Examples of acrylate or methacrylate includes methyl, ethyl, n-propyl, iso-propyl, n-butyl, iso-butyl, sec-butyl, tert.-butyl, n-hexyl, phenyl and benzyl esters of acrylic or methacrylic acid.

Copolymers with acrylate or methacrylate monomer content of less than 2% by weight show only the same flocculation performance as homopolymers of acrylic or methacrylic acid or salts thereof, while the content of more than 2% by weight sharply improves the flocculation performance, which becomes maximum at the hydrophobic monomer content slightly less than the content at which the copolymer loses a water solubility under a pH of 7.

Needless to say, when introducing the hydrophobic monomer in a content more than one at which the water solubility under a pH of 7 disappears, the flocculation properties are almost lost. The amount of the hydrophobic monomer at which the water solubility disappears may vary depending upon types of the monomer unit. Even when acrylic acid-methylacrylate copolymers have the highest hydrophilic group, the copolymer with methylacrylate of 50% by weight or more is insoluble in water at all of the pH.

The molecular weight of polymers of the present invention is given in an approximate value by measurement of viscosity of the aqueous solution containing an excess of neutral salts, for example using the intrinsic viscosity measured in a IN aqueous solution of sodium chloride at 30° C. The higher the molecular weight of the polymers, the higher the flocculation performance and the polymers with molecular weight of less than 100,000 show no flocculation performance in practice.

Both of water and organic solvents can be used as a medium for copolymerization, though for preparing high molecular polymers with excellent flocculation properties water is most preferable. However, when hydrophobic monomers used show a low solubility to the mixture of water with acrylic and methacrylic acids, suitable organic solvents or mixture of water therewith are used if necessary. In case of the use of water as the medium, the high molecular polymers can be obtained by effecting the polymerization in the absence of oxygen at 0–100° C., preferably 10–50° C. with the use of persulphate alone or redox initiator of persulphate and reducing materials. In this case, the initial concentration of monomers is preferably less than 30%.

The polymers obtained by the copolymerization method are used as the flocculant preferably in the form of a slightly alkaline, uniform aqueous solution with low concentration. In case of copolymerizing, for example, acrylic acid and methylacrylate in a total monomer concentration of 20% at 35° C. in an aqueous medium, if the content of methylacrylate is small, the liquid becomes viscous as the polymerization proceeds, and therefore a water-soluble polymer can be obtained without effecting neutralization, while the content of methylacrylate is 15% by weight, the medium brings about a slight turbidity during the polymerization. This means that polymers slightly soluble or insoluble in the water of which pH is lowering due to the presence of acrylic acid or polymers thereof are produced under the polymerization conditions. The said slightly soluble or insoluble copolymers are easily dissolved in water by completely or partially neutralizing the carboxyl group in the copolymers with, for example, hydroxides, carbonates or hydrogencarbonates of an alkali metal or ammonia. If increasing the content of methylacrylate to 25% by weight or more, the copolymer becomes insoluble completely under the polymerization conditions and after polymerization the supernatant shows no viscosity at all. At this time, if a slow and effective stirring is effected during polymerization, a suspension of the coploymer with particles of about 0.1 to 2.0 mm. in diameter in water can be obtained. Thus, the polymer particles with the ratio of acrylic acid to methylacrylate of up to 50:50 (by weight) can be converted to a water-soluble polymer by completely or partially neutralizing the carboxyl group in the copolymer, but when further increasing the content of methylacrylate, the copolymer no longer dissolves in water even if the carboxyl group is completely neutralized.

In connection with the sedimentation accelerating action of the abovementioned copolymer on the neutral suspension of kaolin, a sedimentation rate shows a tendency to increase as the content of methylacrylate increases till the weight ratio of acrylic acid to methylacrylate of 70:30. With the ratio of acrylic acid to methylacrylate comprised between 70:30 and 60:40 the high sedimentation rate is obtained approximately unchanged, while when further increasing the content of methylacrylate the sedimentation rate is gradually lowering. Needless to say, when increasing the content of methylacrylate to 50% by weight or more, the polymer is insoluble in water even if neutralized so that the sedimentation accelerating action is markedly reduced. As mentioned above, it is surprising that the most excellent flocculants can be obtained by preparing the polymer in form of the suspension and converting same to the water-soluble polymer with neutralization. Such a phenomenon is explicable on the basis that the polymers having the specific solubility as mentioned hereinbefore have the composition most suitable for use in high molecular flocculants and that with the use of such polymerization methods that the polymeric particles are deposited during polymerization and the polymer having molecular weight higher than the case of the uniform solution polymerization is produced.

It has been found that such phenomena are observed not only in the case of methylacrylate but also in the case of other acrylate, methacrylate, acrylonitrile or methacrylonitrile. In this connection, however, the composition showing the most suitable results may vary depending upon the type of monomers. It has been found that generally speaking, when the affinity of hydrophobic monomer to be used for copolymerization to water is lowering, a suspended polymer is obtained by increasing the content of acrylic or methacrylate acid, and with that composition a flocculant having the highest performance is obtained.

Examples of a suspension polymerizable composition containing other monomers than methylacrylate include acrylic acid-ethylacrylate in the weight ratio ranging from 85:15 to 75:25, acrylic acid-methyl-methacrylate in the weight ratio ranging from 92:7 to 85:15, acrylic acid-n-propylacrylate in the weight ratio ranging from 92:8 to 85:15, the composition ratio being remarkably different depending upon the type of the monomers.

It is well known that in the preparation of the conventional anionic high molecular flocculants methods of the aqueous solution polymerization are all employed for obtaining the flocculants with particularly excellent properties. However, with the conventional polymerization apparatus the temperature during polymerization can not be controlled because of the aqueous solution having a very high viscosity and also the handling of the viscous liquid encounters a difficulty. To the contrary, in the preparation of some of anionic high molecular flocculants the suspension polymerization is effected in an organic solvent which is non-solvent for the polymer or a mixture of same with water thereby to control the polymerization temperature and simplify the handling of the liquid. However, this method has the fatal disadvantage that a high molecular polymer cannot be obtained in practice and therefore it is impossible to prepare flocculants with excellent properties.

According to an aqueous suspension polymerization employed in the present invention, the viscosity during polymerization is always the same as water and the polymerization temperature can be maintained unchanged by removal of slight heat during polymerization, and further the resulting polymer suspension is easy to handle. Furthermore, there is no disadvantage that high molecular polymers can not be obtained as in the case of using the organic solvent. According to the polymerization process of the present invention polymers with higher molecular weight can be prepared.

Non-ionic and anionic flocculants are in general available commercially in the form of an aqueous solution with low concentration or of powders, but the latter form is being generalized because the former is expensive in transport and slow in a gelatinous liquid dissolving rate.

The conventional flocculants are obtained in the form of powders from the viscous solution of polymer mentioned above by heating the viscous solution to vapourize water, removing the resulting polymer mass and pulverizing same. Further, there is another method comprising diluting the viscous solution with water if necessary, pouring the resulting solution into an non-solvent for the polymer such as methanol thereby to the precipitate polymer from water and obtaining the polymer in the form of powders. The former needs a large quantity of heat for distilling off water and has also disadvantages that the polymer degrades due to heat upon drying. On the other hand the latter has disadvantages that apparatus or means for raising the efficiency of dehydration by methanol are required and also a large quantity of methanol is used for the polymer.

For preparing polymeric powders from the suspension of polymer obtained by the present invention there are proposed two methods of which one includes pulverizing directly the suspension without neutralizing the carboxyl group, the resulting powders being neutralized with an alkali and dissolved in water when used as coagulants, and the other includes preparing a pre-neutralized polymer in the form of powders. The former requires removing the water in the polymer suspension in some manner, but is ineffective because of adhesion between particles of the polymer being relatively large, suitable non-solvents for the copolymer with a relatively low boiling point other than water not being present and the non-neutralized copolymer bringing about degradation and insolubility by thermal cross-linking. On the other hand, in the latter method the neutralization is effected, for example by adding a pre-determined amount of an alkali, e.g. NaOH or its aqueous solution to the polymer suspension. At that time the polymeric particles become soluble in water and finally viscous as the neutralization proceeds. Next, for preparing powders from the above viscous liquid there are the method pulverizing the dryed mass and further the method dispersing the viscous liquid into the non-solvent for the polymer followed by precipitation as mentioned hereinbefore referring to the pulverized method of the conventional flocculants. However, in either method there are the same disadvantages as pointed out in the above mentioned pulverization of the conventional flocculants.

As the results of diligent studies on a process for obtaining polymeric powders without handling the viscous liquid from beginning to end by neutralizing and dehydrating the polymer suspension without destroying the form of the polymeric particles, the inventors have observed that the ssupended polymeric particles are soluble in an alcohol but become insoluble in the alcohol by means of neutralization. According to the present invention, a water-soluble copolymer is obtained in the form of powders by adding the suspension of the copolymer into at least one of hydroxides of an alkali metal and ammonia dissolved in at least one of alcohols of $C_1$ to $C_6$ or a mixture thereof with water while stirring thereby obtaining an alcohol suspension of a water-soluble copolymer completely or partially neutralized and thereafter removing particles of the copolymer.

One of the characteristics of the process for preparing the powdered flocculants according to the present invention is that there is no need to handle a viscous liquid throughout the polymerization and pulverization steps. Besides, the separation of powders and drying are simplified, particularly the drying temperature can be reduced with use of an alcohol having low boiling point such as methanol and ethanol so that no degradation of the polymer due to heating occurs.

Further, the suspensed polymeric particles obtained by the present invention of which shapes are not spherical but complicated have a remarkably large surface area and are maintained unchanged in the shape when pulverized. In addition, the polymer is rich in acrylic or methacrylic salts which are a strong hydrophilic group. Accordingly the polymeric particles of the present invention are superior in the dissolving rate in water to the conventional flocculants.

Though it is necessary for the preparation of good suspension of the copolymer to effect the stirring during polymerization, the stirring is not limited particularly in the type and extent so long as the particles of the copolymer are always stirred in such a way that they are gently moving about in the suspension.

Examples of the alkali to be used in the pulverization include lithium hydroxide, sodium hydroxide, potassium hydroxide and ammonia. The alcohols to be used are exemplified by methylalcohol, ethylalcohol, n-propylalcohol, isopropylalcohol, n-butyl alcohol and n-hexylalcohol, though methylalcohol is particularly preferred in the light of the alkali dissolving rate, miscibility with water and boiling points.

The alkali is used in an amount necessary to neutralize the carboxyl group of the polymer, though for conducting effectively precipitation 1.1–2.0 times the required amount are particularly preferred.

A water content of the alcohol is gradually increasing because of water which is the medium for the polymer suspension when adding the polymer suspension into the alcohol containing an ample amount of the alkali, and if the water content exceeds the weight ratio of water to alcohol of about 4:1, the polymer becomes soluble in the water containing alcohol and therefore is no longer obtained in the form of particles. A ratio of the alcohol to the polymer suspension may be determined within this limit, though for removing effectively the polymer the weight ratio of water to the alcohol at the time of completion of mixing is preferably 2 or less. From the beginning a water containing alcohol may be used instead of alcohols as far as it falls under such conditions.

The thus obtained suspension of neutralized polymers in the water containing alcohol can be easily filtered and converted to a white powdered high molecular flocculant with a water content of less than 15 weight percent by washing the filter cake with the alcohol if necessary, followed by drying at the temperature of about the boiling point of the alcohol.

The high molecular flocculants in the form of the aqueous solution or powders obtained according to the process of the present invention are superior in a sedimentation accelerating action, mechanical strength of the resulting floc and clearness of the supernatant liquid after sedimentation of the floc to any type of the conventional anionic high molecular flocculants. Comparing with acrylamide type flocculants (carboxyl group content, 20 mol percent) which show the most excellent performance in the prior art with reference to the sedimentation accelerating action on kaolin, the flocculants of the present invention have markedly excellent properties as follows:

(1) With a reduced amount the coagulants show little lowering of the sedimentation rate and clearness of the supernatant liquid.
(2) The sedimented kaolin floc has a markedly high strength and shows little lowering of the sedimentation rate and clearness of the supernatant liquid even when the stirring was effected for a long time for preparing the floc or the floc was subject to some shear stress.
(3) The filtration rate is remarkably increased because the floc is made hydrophobic and improved in the mechanical strength.

The performance of the coagulants is rated by measurement of a sedimentation rate of the inorganic compound suspension, light transmittance of the supernatant liquid after the sedimentation and filtration rate.

The sedimentation rate is measured by charging a suspension of 5.0 g. of kaolin (A–38 Kaolin, Tsuchiya Kaolin Comp. Ltd. Japan) or 2.0 g. of finely powdered $Al(OH)_3$ (reagent grade, Wako Junyaku Comp. Japan) in 100 ml. of water into a corked cylinder of 2.5 mm. in inner diameter and 300 mm. in height marked with degrees of 0–100 ml., said suspension being adjusted at a pH of 7, adding a given amount of a 0.1% aqueous solution of flocculants each thereto, tumbling the cylinder by a 6 r.p.m. rotational stirrer for 3 minutes, thereafter allowing the cylinder to stand and reading off an average rate in cm./minute till the level of sedimentation falls from the graduation of 100 ml. to the graduation of 50 ml. In case of kaolin the mechanical strength of the floc is rated by further prolonging the tumbling time mentioned above and measuring the sedimentation rate.

In this way kaolin has been sedimented and thereafter the supernatant liquid is sampled. A cell of 20 mm. in thickness filled with the sample is exposed to the ray of light with wavelength of 600 m$\mu$, and the clearness of the supernatant liquid is indicated in the relative percent transmission when regarding that of purified water as 100%.

As to the filtration rate, 0.2 ml. of a 0.1% aqueous solution of the flocculants are added to a suspension of 10 g. of each of kaolin and precipitated calcium carbonate (Waka Junyaku Comp. Japan, reagent grade) in 200 ml. of water, said suspension being adjusted at a pH of 7, and stirred by the jartester with 100 r.p.m. for five minutes, and thereafter transferred to a filtration tester composed of a cylinder of a pressure-reducible type with graduations of up to 200 ml. which is provided with nutche of 90 mm. in diameter having fitted a filter paper (Filter paper No. 2 of 90 mm. in diameter sold by Toyo Kagaku Sangyo Comp. Japan). The filtration is effected under the reduced pressure of −200 mm. Hg in case of kaolin and of −25 mm. Hg in case of precipitated calcium carbonate. In this manner, the filtration rate is indicated by measuring an average effluent rate in ml./minute while the filtrate increases from 100 ml. to 150 ml.

The present invention will be illustrated in detail by the following examples.

Example 1

95 parts of acrylic acid and 5 parts of methyl acrylate were dissolved in 400 parts of water and charged in a bath adjusted at 30° C. after having been purged by nitrogen. 0.05 parts of potassium persulphate were added thereto and polymerization was effected. At the beginning the polymerization was effected with stirring and then continued without stirring because the viscosity became high. After the polymerization was effected for 20 hours in total, the product was removed. There were little residual monomers. The molecular weight of the polymer was considered to be above 1,000,000 in view of a viscosity of the aqueous solution. The aqueous polymer solution was diluted with a sodium carbonate containing water to a 0.1% concentration.

Example 2

A 0.1% aqueous solution of polymer was obtained in the same manner as Example 1 except that 88 parts of acrylic acid and 12 parts of methacrylate were used.

Example 3

A polymerization was effected in the same manner as Example 1 except that 80 parts of acrylic acid and 20 parts of methylacrylate were used. As the viscosity was increasing during the polymerization, the system became muddy and finally opaque at the end of the polymerization. In the same manner as Example 1, a 0.1% aqueous solution with complete clearness was obtained.

Example 4

70 parts of acrylic acid and 30 parts of methylacrylate were dissolved in 400 parts of water and adjusted at 30° C. after having been purged by nitrogen. After addition of 0.05 parts of ammonium persulphate a polymerization was effected without stirring for 20 hours. With starting of the polymerization the system became cloudy and a white polymer began to precipitate and was gradually sedimented in large quantities. At the end of the polymerization there was no polymer dissolved in the supernatant.

A fully clear liquid was obtained by diluting the polymer solution with a sodium hydroxide containing water to a 0.1% concentration.

Example 5

90 parts of sodium acrylic and 10 parts of methylmethacrylate were dissolved in 400 parts of water and adjusted at 40° C. after having been purged by nitrogen. 0.05 parts of potassium persulphate were added thereto and a polymerization was effected without stirring for 24 hours. Similarly the polymer obtained was diluted to a 0.1% aqueous solution.

Example 6

A 0.1% aqueous solution of polymer was obtained in the same manner as Example 5 except that sodium methacrylate was used instead of sodium acrylate.

Example 7

85 parts of acrylic acid, 10 parts of methylacrylate and 5 parts of butylacrylate were dissolved in 400 parts of water and adjusted at 35° C. after having been purged by nitrogen. After addition of 0.05 parts of ammonium persulphate a polymerization was effected for 20 hours. Thereafter the polymer solution obtained was diluted with a sodium carbonate containing water to a 0.1% concentration.

Example 8

40 parts of methylacrylate and 1.5 parts of sodium lauryl sulphate were charged in 58.4 parts of water and maintained at 40° C. after having been purged by nitrogen. After addition of 0.05 parts of ammonium persulphate an emulsion polymerization was effected with stirring for 6 hours. 100 parts of a polymethylacrylate latex with molecular weight of 4,000,000 were obtained.

50 parts of the above latex were diluted by 950 parts of water containing 9.3 parts of NaOH and hydrolized at 70° C. over 4 hours. The degree of hydrolysis determined by the amount of residual sodium hydroxide was 78% and 22% of methylacrylate remained unchanged. This aqueous solution was diluted with water to a 0.1% concentration.

Example 9

With reference to each of the 0.1% aqueous solutions of flocculants obtained in Examples 1–8 and each of the 0.1% aqueous solutions of the conventional flocculants A, B, and C given hereunder, sedimentation rates of kaolin and Al(OH)$_3$ as well as filtration rates of kaolin and precipitated calcium carbonate were measured in the same way as the methods described hereinbefore except that the addition amount of the flocculants is 0.3 ml. in case of the kaolin and 0.5 ml. in case of Al(OH)$_3$.

The results are given in Table 1.

TABLE 1

| Flocculants | Sedimentation rate, cm./min. | | Filtration rate, cc./min. | |
|---|---|---|---|---|
| | Kaolin | Al(OH)$_3$ | Kaolin | CaCO$_3$ |
| Example— | | | | |
| 1 | 12.4 | 4.1 | 30 | 81 |
| 2 | 19.8 | 4.8 | 38 | 80 |
| 3 | 27.2 | 5.4 | 45 | 79 |
| 4 | 32.1 | 6.1 | 51 | 81 |
| 5 | 9.8 | 4.0 | 42 | 74 |
| 6 | 7.9 | 3.4 | 35 | 70 |
| 7 | 18.4 | 4.9 | 38 | 78 |
| 8 | 26.9 | 4.8 | 37 | 61 |
| Conventional coagulants: | | | | |
| A* | 1.2 | ~0 | 9 | 35 |
| B** | 10.8 | ~0 | 22 | 48 |
| C*** | 1.1 | 3.2 | 7 | 75 |

*Acrylamide type flocculant with degree of hydrolysis of less than 3 mol percent.
**Acrylamide type flocculant with degree of hydrolysis of 20 mol percent.
***Sodium polyacrylate flocculant.

Of the conventional flocculants type B only shows properties close to those of the products of the present invention in respect of the sedimentation rate of kaolin. In case of Al(OH)$_3$, however, with the amount of 3 p.p.m. the acrylamide type shows no flocculation performance at all, while the products of the present invention have remarkable effects and are sharply superior to sodium polyacrylate (flocculant C).

On the other hand, the products of the present invention are sharply superior in the filtration rate in respect of kaolin to all of the conventional flocculants, and in case of precipitated calcium carbonate are comparable to sodium polyacrylate and superior to the acrylamide types.

Example 10

820 parts of water were charged into a polymerization vessel with a stirrer, and 130 parts of acrylic acid and 50 parts of methylacrylate were dissolved therein and elevated to a temperature of 35° C. after having been purged by nitrogen. After addition of 0.03 parts of potassium persulfate a polymerization was effected with stirring. With proceeding of the polymerization copolymers were suspended in the form of fine particles with about 0.1 mm. in diameter and a white suspension was obtained. After polymerization over a period of 18 hours the polymer suspension was removed. It was confirmed that the supernatant liquid show no viscosity and no copolymer soluble in water was present. A concentration of the copolymer was 17.0%. To a solution of 100 parts of sodium hydroxide in 500 parts of methylalcohol cooled to room temperature was added the entire amount of the above acrylic acid-methylacrylate copolymer suspension dropwise with vigorous stirring over a period of about 5 minutes. With the addition a suspension of neutralized copolymer in a water containing methylalcohol was obtained. The copolymer was completely neutralized by allowing it to stand for about 15 minutes, filtered out and dried at 80° C. Thus, white powders of the copolymer with water content of 10% were obtained. As the results of Na-analysis on the copolymer a degree of neutralization of the carboxyl group was 98%. The powdered copolymer showed about the same particle sizes as that after completion of the polymerization. An intrinsic viscosity of the copolymer measured in a 1N aqueous solution of sodium chloride at 30° C. was 29.2 dl./g., its molecular weight being considered above 5,000,000.

Example 11

A suspension of polymer was obtained in the same way as Example 10 except that 120 parts of acrylic acid and 60 parts of methylacrylate were used. The copolymer obtained had particle sizes of about 0.5 mm. in average. A concentration of the copolymer was 17.2%. The copolymer suspension was added dropwise in the same manner as Example 10 into a solution of sodium hydroxide in methylalcohol prepared as mentioned in Example 10 and filtered, and then the filter cake was dried. Thus, a copolymer with water content of 9% was obtained in the form of white powders.

Example 12

130 parts of acrylic acid and 20 parts of methylmethacrylate were dissolved in 850 parts of water and maintained at 35° C. after having been purged by nitrogen. After addition of 0.03 parts of ammonium persulphate a polymerization was effected with stirring for 20 hours. Thus, a copolymer suspension with concentration of 14.3% was obtained. A solution of the above acrylic acid/methylmethacrylate copolymer suspension dissolved therein 10 parts of sodium chloride was added dropwise into a solution of 100 parts of potassium hydroxide in a mixture of 300 parts of ethylalcohol with 300 parts of methylalcohol while stirring violently with an anchor type impeller over a period of ten hours. A white powdered copolymer was obtained by filtering out the resulting suspension of neutralized copolymer and drying the filter cake.

Example 13

A solution of 120 parts of acrylic acid and 30 parts of ethylacrylate in 850 parts of water was added to 0.02 parts of ammonium persulphate at a temperature of 40° C., and then a polymerization was effected while stirring with an anchor type impeller for 15 hours, thus a copolymer suspension being obtained. At the late period of polymerization the copolymer suspension became viscous slightly and consequently 3 parts of sodium chloride were dissolved therein, thus the supernatant liquid lost the viscosity. The concentration of the copolymer was 13.9%.

A white powdered copolymer was obtained by adding dropwise the copolymer suspension in to a solution of sodium hydroxide in methyl alcohol, filtering the resulting suspension of neutralized copolymerand drying the filter cake, in the same manner as Example 10.

Example 14

127 parts of methacrylic acid, 20 parts of methylacrylate and 3 parts of ethylacrylate were dissolved in 850 parts of water in a vessel for polymerization provided with a stirrer and maintained at 35° C. after having been purged by nitrogen. After addition of 0.05 parts of potassium persulphate a polymerization was effected for 20 hours thereby a polymer suspension with concentration of 13.8% was obtained.

In the same manner as Example 10 a white powdered terpolymer was obtained by dropping the above copolymer suspension into a solution of sodium hydroxide in methylalcohol, filtering the resulting suspension and drying the filter cake.

Example 15

999 g. of water were charged into a beaker with a 1000 cc. capacity and 1.0 g. of each of the powdered copolymer obtained in Examples 10–14 was little by little added while stirring with an anchor type impeller, having 200 r.p.m., of 100 mm. in outside diameter. An approximate period of time necessary for dissolving gel in preparation of a 0.1% aqueous solution of copolymer was measured.

Next, a flocculation performance of the 0.1% aqueous solution thus obtained in respect of kaolin suspension was measured as described hereinbefore. Amounts of the coagulants was 3 p.p.m. and 5 p.p.m. (0.3 cc. and 0.5 cc. of the 0.1% aqueous solution), and in case of the addition amount being 5 p.p.m. the measurements were also made in respect of the stirring periods of 10 minutes, 20 minutes and 30 minutes respective. Further, the supernatant liquid was measured in respect of light transmittance. For comparison the conventional coagulants A, B and C used in Example 9 were also measured.

The results are given in Table 2.

TABLE 2

| Coagulants | Dissolution time (minutes) | Sedimentation rate (cm./min.) and light transmittance (percent)[1] | | | | |
|---|---|---|---|---|---|---|
| | | 3 p.p.m., 3 minutes | 5 p.p.m. | | | |
| | | | 3 minutes | 10 minutes | 20 minutes | 30 minutes |
| Example— | | | | | | |
| 10 | 20 | 31 (54) | 68 (52) | 53. (67) | 41 (72) | 31 (62) |
| 11 | 25 | 33 (66) | 75 (61) | 55 (77) | 42 (80) | 30 (75) |
| 12 | 25 | 17 (56) | 48 (55) | 24 (67) | 20 (78) | 16 (65) |
| 13 | 20 | 16 (52) | 45 (55) | 20 (71) | 18 (80) | 15 (55) |
| 14 | 40 | 15 (51) | 45 (61) | 18 (69) | 13 (72) | 12 (53) |
| Conventional coagulant— | | | | | | |
| A | 180 | 1 (64) | 4 (68) | 3 (42) | 3 (38) | 2 (24) |
| B | 150 | 11 (48) | 62 (60) | 39 (38) | 19 (30) | 9 (6) |
| C | 120 | 1 (66) | 2 (61) | 1 (68) | 1 (54) | <1 (38) |
| Nonaddition | | | | 0.4 (5) | | |

[1] Parenthesized figures indicate light transmittance (percent).

The powdered copolymers according to the present invention are superior in the dissolution rate to water to the conventional coagulants and with reduced amounts remarkably increased in the sedimentation acceleration action as compared with the polyacrylamide type having degree of hydrolysis of 20 mol percent (B) which shows the highest fluocculation performance among the conventional coagulants. Further, with use of the coagulants of the present invention in the amount of 5 p.p.m. the resulting floc shows high mechanical strength.

What is claimed is:

1. A process for the preparation of a high molecular fluocculant with a molecular weight greater than 1,000,000 determined by measurement of viscosity of an aqueous solution containing an excess of neutral salts which comprises polymerizing 55 to 95 weight percent of at least one (i) of acrylic or methacrylic acids and 45 to 5 weight percent of at least one (ii) of monomers represented by the formula

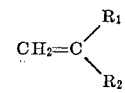

wherein $R_1$ is a hydrogen or methyl and $R_2$ is —COOR$_3$ radical wherein $R_3$ is alkyl, aryl or alkylaryl groups or —CN radical in water medium with stirring to produce a suspension of a copolymer which is insoluble under the polymerization conditions but soluble in neutral or alkaline water, adding said suspension into at least one of hydroxides of an alkali metal or ammonia dissolved in at least one of alcohols of $C_1$ to $C_6$ or a water-containing alcohol with stirring thereby obtaining an alcohol suspension of a water-soluble copolymer with its carboxyl group being completely or partially neutralized, and then removing the copolymer in form of particles followed by drying.

2. A process of claim 1 wherein said monomer (i) is acrylic acid and said monomer (ii) is at least one selected from the group consisting of methylacrylate, ethylacrylate, methylmethacrylate and acrylonitrile.

3. A process of claim 1 wherein said alcohol is one of carbon atoms not more than 3.

4. A process of claim 1 wherein acrylic acid is used in an amount of 60–75 weight percent as said monomer (i) and methylacrylate is used in an amount of 25–40 weight percent as said monomer (ii).

5. A process of claim 1 wherein acrylic acid is used in an amount of 85–92 weight percent as said monomer (i) and methylmethacrylate is used in an amount of 8–15 weight percent as said monomer (ii).

6. A process of claim 1, wherein the polymerizing is effected in the absence of oxygen and in the presence of persulfate at a temperature of °–100° C.

7. A process of claim 6, wherein said temperature is 10–50° C.

8. A process of Claim 1, wherein the weight ratio of water to alcohol is less than 4:1.

9. A process of claim 8, whrein said weight ratio is less than 2:1.

References Cited

UNITED STATES PATENTS

| | | | |
|---|---|---|---|
| 2,956,046 | 10/1960 | Glavis et al. | 260—86.1 E |
| 2,958,611 | 11/1960 | Ulrich | 260—86.1 E |

HARRY WONG, JR., Primary Examiner

U.S. Cl. X.R.

210—54; 260—85.5 ZA, 85.5 S